United States Patent [19]

Perrone

[11] Patent Number: 4,759,922
[45] Date of Patent: Jul. 26, 1988

[54] ANHYDROUS SODIUM DICHROMATE IN FLAKES; PROCESS AND APPARATUS FOR ITS PREPARATION ON AN INDUSTRIAL SCALE

[75] Inventor: Diego Perrone, Cogoleto, Italy
[73] Assignee: Luigi Stoppani S.p.A., Milan, Italy
[21] Appl. No.: 788,161
[22] Filed: Oct. 16, 1985

[30] Foreign Application Priority Data

Oct. 16, 1984 [IT] Italy ................................ 23155 A/84

[51] Int. Cl.$^4$ ............................................ C01G 37/14
[52] U.S. Cl. .................................................... 423/597
[58] Field of Search ......................................... 423/597

[56] References Cited

U.S. PATENT DOCUMENTS 4,171,248 10/1979 Carlin .................................. 423/597

FOREIGN PATENT DOCUMENTS 443782 3/1936 United Kingdom .
1050485 12/1966 United Kingdom .
1010015 4/1983 U.S.S.R. .............................. 423/597

OTHER PUBLICATIONS

Sorokin et al, "Chemical Abstracts", vol. 72, 1970, #134789j.

Karnaev et al, "Chemical Abstracts", vol. 83, 1975, #199500e.

Primary Examiner—Robert L. Stoll
Attorney, Agent, or Firm—Young & Thompson

[57] ABSTRACT

A new anhydrous sodium dichromate in flakes, $Na_2Cr_2O_7$, m.p. 356° C. (dec. 400° C.) is described, characterized in that it comes in flakes with an area of approx. 1 $cm^2$, thickness 0.5 mm and apparent specific gravity 1.10 (absolute 2.748) at 25° C.; it is not deliquescent, nor does it become powdery. It is prepared from dihydrate sodium dichromate or aqueous solutions thereof using a new process in two stages, namely (a) evaporation-melting of the dihydrate salt or concentrated aqueous solution at a strictly controlled temperature of around 380° C. and no higher, and (b) flaking of the melted mass obtained thereby, as it is being rapidly cooled to 150°–160° C. The apparatus for carrying out the process is also claimed; said apparatus consisting essentially of a dehydrator-melter oven, a flaker rotating at 10–20 revs per minute and a heat recovery system. The thermic contribution, respectively positive and negative in the two stages, is provided by means of a particular eutectic mixture of melted salts, which melts at 139° C. Said mixture is composed of $KNO_3$ 52.2%, $NaNO_3$ 7.0%, $NaNO_2$ 39.4%, $K_2Cr_2O_7$ 1.4%.

4 Claims, 1 Drawing Sheet

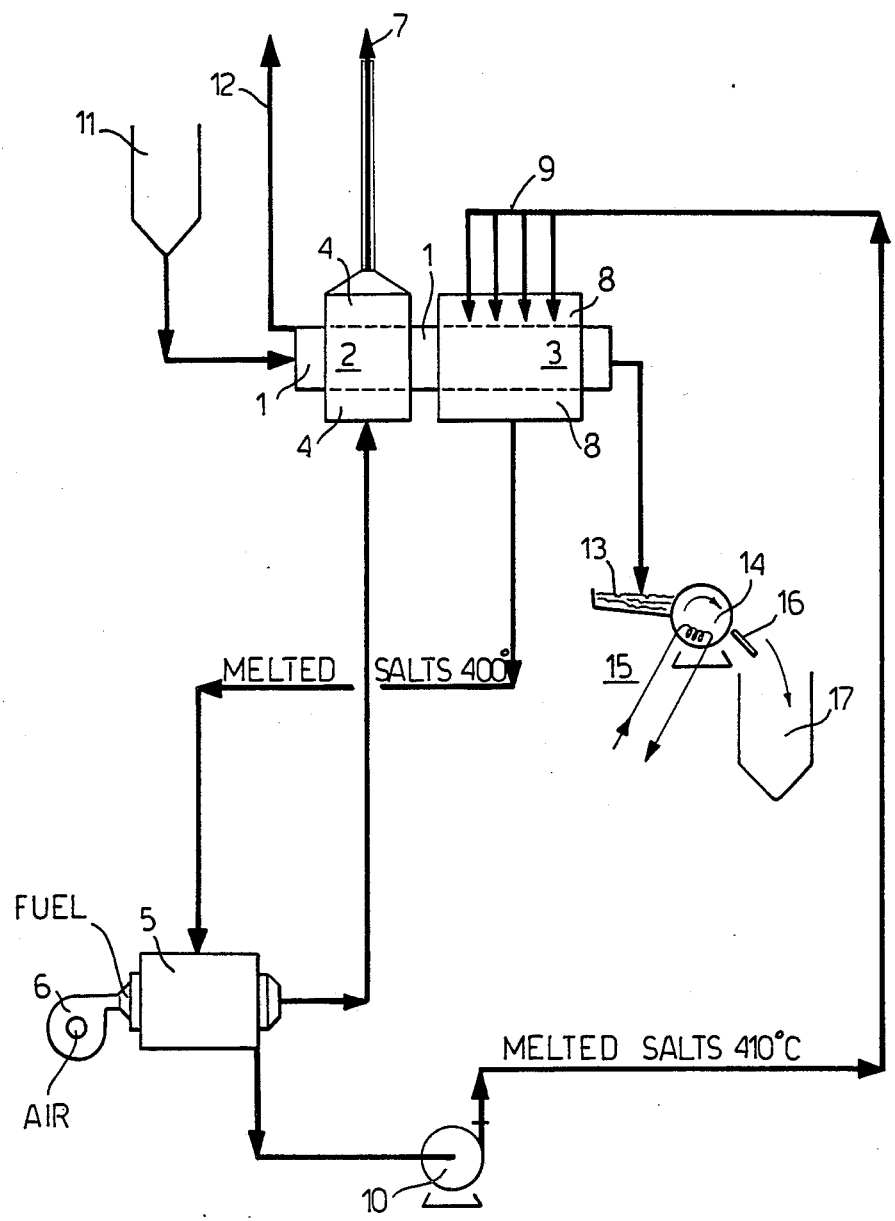

ANHYDROUS SODIUM DICHROMATE IN FLAKES; PROCESS AND APPARATUS FOR ITS PREPARATION ON AN INDUSTRIAL SCALE

This invention relates to an anhydrous sodium dichromate, to a process for its preparation and an apparatus for the carrying out thereof.

The problem in question is widely felt in the industrial field and has led to the requirement of eliminating the disadvantages connected with the product sold at present.

As is known, sodium dichromate is generally marketed in the form of dihydrate crystals which also contain fine powder. It is obtained in this form from concentrated aqueous solutions thereof by crystallization, centrifugation and drying. Nevertheless, the product in question is a hygroscopic and deliquescent one which, in the silos wherein it is stored, forms into compact masses or "bridges" which are very difficult to discharge, move and use.

Furthermore, the presence of fine dust suspended in the air in the workplace is very harmful, especially—as is well-known—to the respiratory system.

In order to avoid such disadvantages, there is the tendency to replace it with the anhydrous product (m.p. 356.7° C.; dec. at 400° C.; absolute specific gravity 2.748 at 25° C.) which, while suitable for the same uses, offers appreciable advantages compared to the dihydrate salt, such as, in particular, easy storage, savings in the cost of conveying and storing and possible use in dry mixtures.

However, the processes proposed up to now for the preparation of anhydrous dichromate have not given satisfactory results. These are small-scale discontinuous processes for heating the dihydrate crystal or acqueous solutions so as to evaporate the water; in practice, because these processes are not very practical, they are only suitable for treating small quantities of the product for special uses.

The object of this invention is to overcome the disadvantages of the known processes for obtaining on an industrial scale an anhydrous dichromate which is not deliquescent and more economical.

Therefore the object of this present invention is a new melted anhydrous sodium dichromate in the form of particular flakes, which is not deliquescent and does not have the disadvantages of the sodium dichromate available on the market.

The object of this invention is also a new process for obtaining said product. It is a two-stage continuous process which permits economical industrial production of a non-deliquescent, melted, anhydrous sodium dichromate, starting from dihydrate sodium dichromate crystals or concentrated solutions thereof.

A further object of the invention is the apparatus used to obtain said product.

It was in fact discovered during research that it is possible to obtain a sodium dichromate free from the disadvantages of the known product by a new process, based essentially on two requirements: a continuous operation and precise temperature control during the entire process with the aim of avoiding partial decomposition of the product.

Therefore, the new process for obtaining the non-deliquescent, melted sodium dichromate is firstly a continuous one and, in particular, takes place in two continuous stages: in the first the dihydrate sodium dichromate is dehydrated and melted at about 380° C.; in the second the melted salt passes to the flaking process, where it is immediately cooled and simultaneously flaked under precisely controlled critical conditions of temperature and cutting speed of the doctor blade, so as to form a flake of an exact size and shape which impart to the final sodium dichromate the desired characteristics, especially absence of deliquescence and powderiness.

The essential requirement in the first stage is firstly accurate control of the product temperature, which should be carefully regulated to about 380° C., taking care not to exceed it, in order to avoid degradation of the product, which starts to decompose at 400° C., and thereby also that of the resulting commercial product's qualities.

Moreover, it is indispensable that, after dehydraulation, the product is kept in the molten state for the shortest time possible. This is provided for in particular by the continuous operation whereby the melted product passes immediately to the second stage of flaking, where it is immediately cooled and flaked under particular conditions, as indicated below.

In the second stage, which follows continuously on the first, accurate temperature control is also essential: first of all an immediate and rapid cooling of the product arriving in the molten state. Moreover, said cooling must occur to the exact degree required for the product to take on the particular shape of the desired flake.

In this way, with the aid of a continuous operation and accurate temperature control, the indispensable conditions are created for forming the precise flake claimed and, in short, the new non-deliquescent sodium dichromate.

The requirement, characterizing this invention, of regulating as precisely as possible the temperture in both states (without exceeding the limits indicated) has made it advisable to use a diathermic fluid for the positive and negative thermic contribution, in order to both melt the sodium dichromate in the first-stage melting oven and to cool the molten mass on the drum of the flaker in the second stage.

Besides permittng precise temperature control, this system guarantees greater safety in this processing apparatus and by simplifying it reduces the cost.

On the other hand, the need to work with diathermic fluid at rather high temperatures (410° C.) led to the exclusion of diathermic oils (of known use for similar purposes) for safety reasons, in as much as most of them begin to decompose at such temperatures. Moreover, in the first stage, they may form with sodium dichromate a dangerous compound in the case of accidental contact and at those temperatures.

Therefore, it has been considered expedient to make use of mixtures of melted salts: a system which guarantees greater safety in the processing apparatus and simplifies the latter, while at the same time ensuring precise temperture control.

For this purpose a eutectic mixture of (melted) salts has been perfected, with a particular composition, at 139° C.

This mixture comprises:
$KNO_3$ 52.5%
$NaNO_3$ 7.0%
$NaNO_2$ 39.4%
$K_2Cr_2O_7$ 1.4%; melting point 139° C.

It has been found, incidentally, that the same mixture, suitably cooled, can also be used in a separate circuit (maintaining said mixture at 150°-160° C.) for cooling the drum of the flaker in the second stage.

The process according to the present invention is carried out in a particular apparatus which consists essentially, for the first stage, of a continuous, rotating, tubular evaporator-melter oven and, for the second stage, of a flaker.

The oven is provided with a hopper for feeding the dihydrate sodium dichromate and is made up of two sections: in the first the dihydrate sodium dichromate is eheated with the recovered gas from the salt-melting boiler; in the second the evaporation and actual melting take place. This latter section is accurately dimensioned so as to permit a minimum staying time for the just dehydrated, melted product at an almost constant maximum temperature of 380° C. Said section is heated with the melted salts, sprayed at 410° C. and recycled continuously, at 400° C., to the salt-melting boiler.

The flaking device comprises a collecting tank for the melted anhydrous dichromate and a cylindrical drum (flaker) containing the previously described mixture of melted salts, into which a steel coil containing water is immersed, removing the exess heat by evaporation thereof. In this way the temperature of the shell of the drum, whereto the molten mass is sent from the first stage, is kept constant at 150°-160° C. At the same time the speed of the drum is regulated at between 10 and 20 revs per minute and the drum is fitted with a scraping blade which removes the anhydrous dichromate solidifying thereon.

The flaking operation is especially delicate, because on it depends to a large extent the exact size which the flake must take on and which, according to the present invention, gives said flake the desired characteristics.

Said operation is the result of special arrangments in regulating the temperature and rotating speed of the drum, which allow a mass of solidified dichromate to be brought into contact with the doctor blade, said mass having a temperture, however, such that it can be easily removed in flakes, while, on the other hand, not making the product so adhesive that it is difficult to detach.

It has been ascertained that at a drum speed above 20 revs per minute, for example, the molten mass of dichromate not having enough time to solidify, reaches the doctor blade in a too molten or too pasty state.

Furthermore, a reduction in the number of revolutions of the drum, in order to avoid an excessive increase in temperature (which results in a too pasty mass), would also be translated into a reduced capacity of the apparatus.

On the other hand, it has been established by experiment that with the drum operating at temperatures below 130° C. the pasty mass sticks to the drum to an increasingly lesser degree, forming big flakes which detach from the cylinder in chips, before reaching the doctor blade, and fall back into the molten mass as it is being fed in.

If, on the other hand, the temperature is above 190° C. the molten mass tends to stick firmly to the rotating cylinder, making it so difficult to remove that, in an extreme case, it even causes the machine to stop.

It is clear from what is stated above that, when operating the flaker, a constant internal temperature of 150°-160° C. must be maintained, in as much as it represents an optimal critical temperture, just as the speed of 10-20 revs per minute of the flaker drum is critical. This is so that the mass cooling on the drum achieves the exact degree of pastiness which permits the doctor blade to remove a flake of characteristic size and shape, which give to the finished product its particular quality of a new product, having the above-indicated properties.

As has been discussed above, an accurate and simple temperature control, which is one of the determining factors in the efficient carrying out of this process, has been made possible by the use of the eutectic mixture claimed herein. Furthermore, this mixture permits, in particular, undesired superheating of the product to be avoided and thereby a possible partial degradation of the marketable product.

Finally, it should be noted that recovery of the heat from the burnt gases in the burner is also provided in the process. This also contributes to reducing the cost of production.

By operating as described above, the new product is obtained which is claimed herein and namely a melted, anhydrous sodium dichromate $Na_2Cr_2O_7$ (molecular weight 262.01), neither deliquescent nor powdery, with the characteristic form of a flake, having a particular size and shape, in precise terms: area of the flake about 1 $cm^2$, thickness 0.5 mm, apparent specific gravity 1.10, absolute specific gravity 2.748 at 25° C. and melting point 356.7° C. (start of decomposition at 400° C.).

The new anhydrous, melted sodium dichromate in flakes according to the invention meets all the market requirements, in as much as it is neither deliquescent nor turns powdery and is more economical, because it can be obtained with a more simple and economical process, as well as being safer than the dichromate sold at present. Moreover, it is easier to handle, move and store and may also be used in dry mixtures. This new anhydrous dichromate is suitable for all the uses of a dihydrate, especially in the tanning industry, the preparation of pigments as a mordant in dyeing, in the textile industry, wood preserving, electroplating, the chemicals industry and generally as an oxidizing agent, as well as in agriculture as a defoilant.

For a better understanding of this invention the process is described below with reference to the sole drawing FIGURE which is a diagram of the apparatus.

Reference numeal 1 denotes the rotatory tubular evaporator-melter; in it the two sections of preheating 2 and actual melting-evaporating 3 can be distinguished. In the preheating chamber 4 the tubular device is washed on the outside by the hot combustion gases coming from the salt-melting boiler 5, equipped with a burner 6. The gases are then sent to the chimney 7. In the heating chamber 8 the tubular device is sprayed from a sprayer 9 with the melted salts at the (input) temperature of 410° C. Then, at a (output) temperature of 400° C., said salts return to the boiler by means of the pump 10 for heating and recycling.

The sodium dichromate, contained in the hopper 11 in the form of dihydrate crystals, is fed continuously and evenly to the evaporator and, while the steam produced escapes from 12, the anhydrous sodium dichromate leaves the melting oven in the molten state at the (output) temperature of 380° C. and continuously feeds the collecting tank 13 of the cylindrical flaker 14. The latter is cooled internally by the melted salts, kept at the temperature of 160° C. by means of the immersed steel coil 15 whereinto water is sent.

The anhydrous sodium dichromate scales detached by the doctor blade 16 drop into the collecting hopper 17.

Likewise for illustrative purposes, an exemplary preparation of the melted, anydrous sodium dichromate in flakes according to the invention is given herein below.

EXEMPLARY PREPARATION OF THE ANHYDROUS SODIUM DICHROMATE IN FLAKES

The dihydrate sodium dichromate (100 kg/h) was introduced into a continuous tubular iron reactor, heated to about 390° C. with the eutectic mixture claimed herein. The outgoing melted mass (87 kg/h) was sent to the flaker at a temperature of 380° C.

The flaker consisted of a rotating cylinder, 290 mm in length and 290 mm in diameter, fitted with a doctor blade.

The eutectic mixture described above was contained inside the cylinder. The drum was made to rotate at a speed of between 10 and 20 revs per minute: it was noted that, at a higher speed, the product does not solidify in time and comes into contact with the doctor blade still in an almost molten (or pasty) state. Inside the cylinder the temperature was maintained constant at 150°–160° C., as described. It was ascertained that only by using these arrangements could flakes be obtained with the required characteristics of 1 cm$^2$ in area, 0.5 mm in thickness and an apparent specific gravity of 1.1.

In fact, operating at temperatures inside the cylinder of below 150° C., the product sticks thereto to a lesser degree forming big flakes, which detach from the cylinder before reaching the doctor blade and drop back into the fed molten mass. This phenomenon was more marked, the lower the temperature of the drum.

On the other hand, if the temperature was higher than 160° C., the product tended to stick so firmly to the rotating cylinder as to make it difficult to detach said product from the doctor blade, with the risk of stopping the machine.

What I claim is:

1. Process for producing anhyrous sodium dichromate in flakes, comprising the steps of:
    dehydrating and melting sodium dichromate dihydrate in a first reactor at approximately 380° C. to obtain molten anhydrous sodium dichromate;
    continuously transferring said molten anhydrous sodium dichromate to a second reactor;
    cooling and flaking said molten anhydrous sodium dichromate in said second reactor at a temperature comprised between 150° and 160° C., thereby to obtain anhydrous sodium dichromate in the form of flakes.

2. Process according to claim 1, wherein said first reactor is maintained at approximately 380° C. by a eutectic mixture of molten salts comprising, by weight, 52.2% $KNO_3$, 7.0% $NaNO_3$, 39.4% $NaNO_2$ and 1.4% $K_2CR_2O_7$, said sodium dichromate dihydrate being dehydrated and melted indirectly by said eutectic mixture.

3. Process according to claim 1, wherein said second reactor comprises a rotary drum onto which said molten anhydrous sodium dichromate is introduced, said drum being rotated at 10–20 revolutions per minute and having a doctor blade mounted adjacent thereto for effecting said flaking.

4. Anhydrous sodium dichromate produced by the process of claim 1, in the form of flakes having an area of about 1 cm$^2$, a thickness of about 0.5 mm, an apparent specific gravity of 1.10 at 25° C. and an absolute specific gravity of 2.748 at 25° C.

* * * * *